(12) United States Patent  
Basson et al.

(10) Patent No.: US 8,271,517 B2  
(45) Date of Patent: Sep. 18, 2012

(54) PRESENTATION OF WEBSITES TO A COMPUTER USER

(75) Inventors: Sara H. Basson, White Plains, NY (US); Dimitri Kanevsky, Ossining, NY (US); Edward Emile Kelley, Wappingers Falls, NY (US); Irina Rish, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 12/330,767

(22) Filed: Dec. 9, 2008

(65) Prior Publication Data

US 2010/0145965 A1 Jun. 10, 2010

(51) Int. Cl.  
*G06F 17/30* (2006.01)  
*G06Q 99/00* (2006.01)

(52) U.S. Cl. ........................................ 707/769; 705/319

(58) Field of Classification Search .......... 705/317–319; 707/741–771, 796–808  
See application file for complete search history.

(56) References Cited

U.S. PATENT DOCUMENTS

| | | | |
|---|---|---|---|
| 7,251,687 B1 | 7/2007 | McCullough | |
| 7,702,685 B2 * | 4/2010 | Shrufi et al. | 707/760 |
| 2003/0014274 A1 | 1/2003 | Chalon | |
| 2006/0020646 A1 | 1/2006 | Tee et al. | |
| 2007/0078958 A1 | 4/2007 | Bennett | |
| 2007/0208719 A1 | 9/2007 | Tran | |
| 2008/0243607 A1 * | 10/2008 | Rohan et al. | 705/14 |
| 2008/0294607 A1 * | 11/2008 | Partovi et al. | 707/3 |
| 2010/0037141 A1 * | 2/2010 | Carter et al. | 715/733 |
| 2010/0274815 A1 * | 10/2010 | Vanasco | 707/798 |

OTHER PUBLICATIONS

Kent, The Internet, 2001, Penguin Group, 7th edition, pp. 30-34, 47-49.*

* cited by examiner

*Primary Examiner* — Wilson Lee  
(74) *Attorney, Agent, or Firm* — Law Offices of Ira D. Blecker, P.C.

(57) ABSTRACT

A method, computer readable storage medium, computer program product and a service. A profile of a computer user is obtained that contains meta tags descriptive of the participants of a first social networking website. A second social networking website having meta tags is selected. A profile from the second social networking website is selected. The meta tags of the first and second social networking websites are compared to determine if there is a match of at least one meta tag. Then, a search is made for related websites having at least one meta tag that matches the at least one meta tag. A list of the related websites is then presented to the computer user.

16 Claims, 2 Drawing Sheets

PRESENTATION OF WEBSITES TO A COMPUTER USER

BACKGROUND OF THE INVENTION

The present invention relates to a method of intelligently presenting relevant websites to a computer user who is interested in retrieving information from the internet.

In an increasingly networked world, computer users frequently use online resources to access information. For example, search engines are a popular tool through which computer users enter a search query describing information of interest and receive back documents or links to documents that relate to the search query. Search engines may be tailored to a particular area of interest, such as a general web search engine, a news search engine, or a shopping search engine.

When a user requests information from Internet resources such as the World Wide Web, the computer user's browsing experience may be personalized in accordance with certain characteristics, preferences and interests (for example), which are peculiar to the computer user. Such characteristics, preferences and interests may be stored in a user profile.

Of particular interest to many computer users today are social networking websites which focus on building online communities of people who share interests and activities, or who are interested in exploring the interests and activities of others. Social networking has created new ways to communicate and share information. Social networking websites have information that you have posted about yourself and your activities and interests or that others have posted about you. Social networking websites are being used regularly by millions of people, and it now seems that social networking will be an enduring part of everyday life. Popular social networking sites include MySpace and Facebook but social networking sites also include applications for business, medical and the social good.

Social networking services allow users to create a profile for themselves which can be shared with other like-minded users.

An important part of internet searching are metatags (sometimes also called just "tags"), often invisible to the casual computer user, which are keywords or terms assigned to a piece of information and allow it to be found on the internet by browsing or searching.

McCullough U.S. Pat. No. 7,251,687, the disclosure of which is incorporated by reference herein, discloses building a profile of a computer user based on the websites (network addresses) accessed by the computer user and then comparing these network addresses to addresses in a second profile. If there is a strong match, an assumption is made that the other accessed addresses in the second profile apply to the computer user as well. Categorization of the websites is also provided and the categorization may be in the form of meta tags.

Tran U.S. Patent Application Publication 2007/0208719, the disclosure of which is incorporated by reference herein, discloses intellectual property document management wherein search results over a network relating to an intellectual property interest are provided to a user based on an associated user profile and documents are identified as those having a tag (meta tag or user-generated tag) responsive to the intellectual property interest.

Bennett U.S. Patent Application Publication 2007/0078958, the disclosure of which is incorporated by reference herein, discloses characterizing a website by the use of tags and then intelligently predicting a profile of user traffic at the website.

Tee et al. U.S. Patent Application Publication 2006/0020646, the disclosure of which is incorporated by reference herein, discloses the management of data over a network that provides an intelligent file system that uses user profiles, policies and meta-data to manipulate the storage of information.

Chalong U.S. Patent Application Publication 2003/0014274, the disclosure of which is incorporated by reference herein, discloses the use of a user profile to perform searching requests in accordance with profile tags that are generated to locate user preference information within the search.

However, there remains the need to have a richer experience from social networking websites and other websites related thereto.

BRIEF SUMMARY OF THE INVENTION

The various advantages and purposes of the present invention as described above and hereafter are achieved by providing, according to a first aspect of the invention, a method of presenting websites to a computer user, the method comprising the steps of:

obtaining a profile of a computer user that contains meta tags descriptive of the participants of a first social networking website;

selecting a second social networking website having meta tags;

selecting a profile from the second social networking website;

comparing the meta tags of the computer user profile with the meta tags of the profile from the second social networking website to determine at least one match between the meta tags of the computer user profile and the meta tags of the profile from the second social networking website;

searching for related websites having at least one meta tag that matches the at least one matched meta tag of the profile from the second social networking website; and presenting a list of the related websites to the computer user.

According to a second aspect of the invention, there is provided a computer readable storage medium storing instructions that, when executed by a computer, causes the computer to perform a method of presenting websites to a computer user, the method comprising the steps of:

obtaining a profile of a computer user that contains meta tags descriptive of the participants of a first social networking website;

selecting a second social networking website having meta tags;

selecting a profile from the second social networking website;

comparing the meta tags of the computer user profile with the meta tags of the profile from the second social networking website to determine at least one match between the meta tags of the computer user profile and the meta tags of the profile from the second social networking website;

searching for related websites having at least one meta tag that matches the at least one matched meta tag of the profile from the second social networking website; and presenting a list of the related websites to the computer user.

According to a third aspect of the invention, there is provided a computer program product comprising:

a computer usable medium having computer readable program code means embodied therein for a website presenting method, the computer readable program code means in the computer program product comprising:

computer readable program code means for causing a computer to obtain a profile of a computer user that contains meta tags descriptive of the participants of a first social networking website;

computer readable program code means for causing a computer to select a second social networking website having meta tags;

computer readable program code means for causing a computer to select a profile from the second social networking website;

computer readable program code means for causing a computer to compare the meta tags of the computer user profile with the meta tags of the profile from the second social networking website to determine at least one match between the meta tags of the computer user profile and the meta tags of the profile from the second social networking website;

computer readable program code means for causing a computer to search for related websites having at least one meta tag that matches the at least one matched meta tag of the profile from the second social networking website; and computer readable program code means for causing a computer to present a list of the related websites to the computer user.

According to a fourth aspect of the invention, there is provided a method for a website presenting service the method comprising the steps of:

obtaining a profile of a computer user that contains meta tags descriptive of the participants of a first social networking website;

selecting a second social networking website having meta tags;

selecting a profile from the second social networking website;

comparing the meta tags of the computer user profile with the meta tags of the profile from the second social networking website to determine at least one match between the meta tags of the computer user profile and the meta tags of the profile from the second social networking website;

searching for related websites having at least one meta tag that matches the at least one matched meta tag of the profile from the second social networking website; and presenting a list of the related websites to the computer user.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 4:
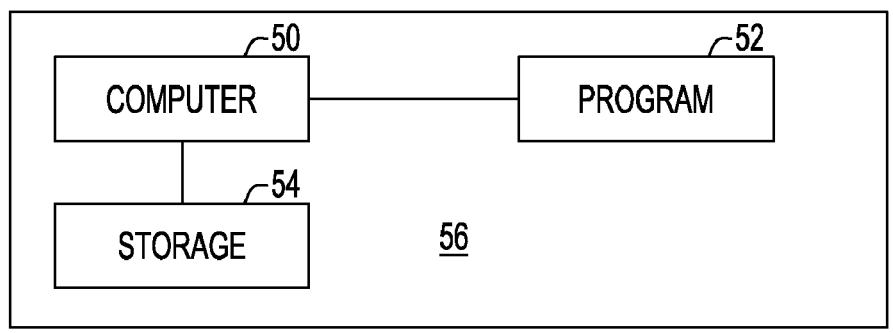
FIG. 4 is a block diagram that illustrates one exemplary hardware environment of the present invention.

The program environment in which a present embodiment of the invention is executed illustratively incorporates a general-purpose computer or a special purpose device such as a hand-held computer. FIG. 4 is a block diagram that illustrates one exemplary hardware environment of the present invention. The present invention is typically implemented using a computer system 56 comprising computer 50 comprised of microprocessor means, random access memory (RAM), read-only memory (ROM) and other components. The computer may be a personal computer, mainframe computer or other computing device. Resident in the computer 50, or peripheral to it, will be a storage device 54 of some type such as a hard disk drive, floppy disk drive, CD-ROM drive, tape drive or other storage device.

Generally speaking, the software implementation of the present invention, program 52 in FIG. 4, is tangibly embodied in a computer-readable medium such as one of the storage devices 54 mentioned above. The program 52 comprises instructions which, when read and executed by the microprocessor of the computer 50 causes the computer 50 to perform the steps necessary to execute the steps or elements of the present invention.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The present inventors propose a method of selecting related websites based on intelligent parsing of the websites. The present invention uses profiles linked to social networking websites that are meta tag based. The related websites may be social networking communities or could be websites that have nothing to do with social networking. The selection of the related websites will be made according to a profile selected from a plurality of profiles at a social networking website. Each profile will have descriptive meta tags that are based on the meta tags used on social networking community websites.

An objective of the present invention is to find persons having similar interests as the computer user and then retrieve websites that those persons have visited in an effort to present more websites of interest to the computer user.

Figure 1:
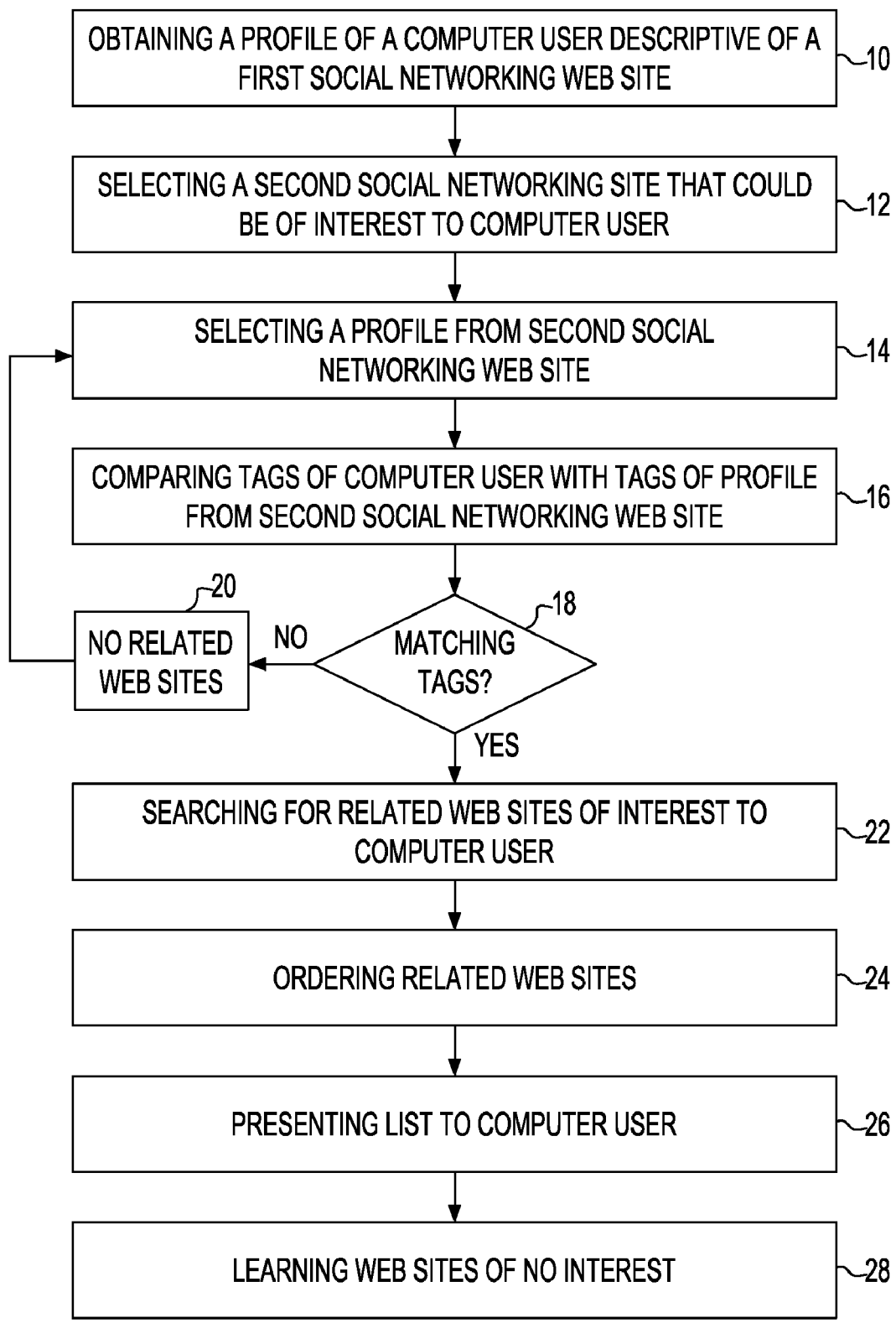
FIG. 1 is a flow chart of the overall process according to the present invention.

Referring to the Figures in more detail, and particularly referring to FIG. 1, there is shown a flow chart illustrating the overall process of the present invention. In block 10, the first step of the process is obtaining a profile of a computer user that contains meta tags descriptive of the participants of a first social networking website. Recall that social networking websites have information that a computer user has posted about the computer user and the computer user's activities and interests or that others have posted about the computer user. More details of the first step of the process of obtaining a profile of a computer user is shown in FIG. 2.

Figure 2:
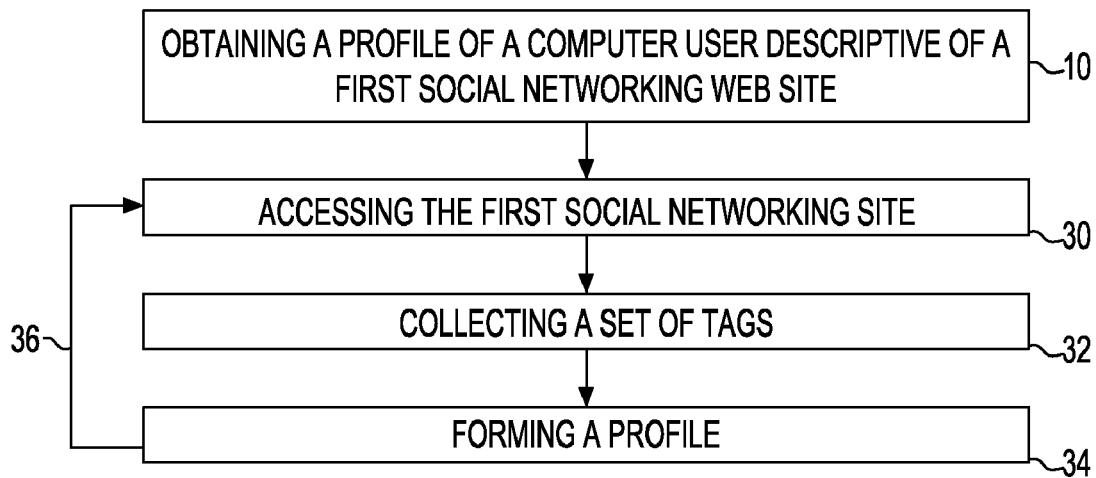
FIG. 2 is a flow chart in more detail of the first step of the process according to the present invention.

Referring now to FIG. 2, obtaining a profile comprises several steps which includes accessing a first social networking website (block 30) followed by collecting a set of meta tags that describe the participants of the first social networking website (block 32) and then forming a profile based on the set of meta tags from the first social networking website. In practice, this process of obtaining a profile for the computer user could be done multiple times (as indicated by loop 36) for the social networking websites that are of interest to the computer user.

For example, assume that the computer user is interested in sports, particularly baseball and football and the computer user visits a sports-related social networking website such as FanNation. A profile would be built of the computer user using meta tags from the Fan nation website indicating all of the interests that the computer user has in baseball and football. The computer user may be interested in only college baseball and football or only professional baseball and football or both. Such attributes would be noted in the computer user's profile. The computer user could build the profile manually or, preferably, an agent could do that for the computer user using the meta tags from the other participants of the FanNation website.

An agent is a program that performs some information gathering or processing task in the background. Typically, an agent is given a very small and well-defined task. Many companies now sell software that enables one to configure an agent to search the internet for certain types of information. With respect to the present invention, the agent could be resident on the computer user's computer or could be located remotely in another computer system or website.

Referring back to FIG. 1, the next step of the process shown in block 12 would be selecting a second social networking website having meta tags. This second social networking website would be another social networking website that is of interest to the computer user. For example, the computer user could build his profile from a social networking website like FanNation as indicated above and then the second social networking website could be a social networking website like Fanspot.

Then, the process continues by selecting a profile from the second social networking website as shown in block 14. The objective here is to select a profile of another person that has at least some interests in common with the computer user. That is, a profile of a person having similar interests in baseball and football would be ideal. At this point in the process however, it is not known if the selected profile of the person at the second social networking website has any interests in common with the computer user.

Once the profile from the second social networking website is selected as indicated in block 14, the next step is comparing the meta tags of the computer user profile with the meta tags of the profile from the second social networking website to determine at least one match between the meta tags of the computer user profile and the meta tags of the profile from the second social networking website as indicated by block 16.

As indicated in block 18, the result of comparing the meta tags as just described is a match or not. If no match is found, then there are no related websites of interest to the computer user as indicated in block 20. Another profile from the second social networking website could then be selected (block 14), compared (block 16) and determined if there is match (block 18). The system would continue selecting profiles from the second social networking website until at least one match is found or the computer user stops the process.

If the result in block 18 is that there are matching meta tags, then the next step is searching for related websites that are of interest to the computer user on the internet, as indicated in block 22. The related websites would have at least one meta tag that matches the meta tags of the profile from the second social networking website. In a preferred embodiment, the agent would actually do the searching. In one preferred embodiment, the searching of related websites would look only for those related websites that have meta tags that correspond to the meta tags matched in the previous step, block 18.

Different criteria may be used to determine whether a match (block 18) has been made between the meta tags of the profiles. For example, the criteria can be that a match between meta tags is made when there is at least one meta tag of the profile from the second social networking website that matches a meta tag of the computer user profile. This would give the broadest range of searching capability when the related websites are searched for. However, a large number of websites of low interest are apt to be found. Therefore, a better criteria might be to look for multiple matches between the meta tags of the profile from the second social networking website and the meta tags of the computer user profile. As an example, assume there are 10 meta tags in the computer user profile. If a match is determined when there is a match of 10 meta tags, related websites of high interest are bound to be found but there will also be a smaller number of related websites likely to be found. If a small number of related websites are found, the criteria can be changed to a lower number of meta tag matches. The point here is that the criteria may be varied to suit the likelihood of websites being found.

An alternative method of determining a match is to use a weighting or scoring of the meta tags. Assume that the computer user is interested in football but is more interested in college football and is most interested in college football played in the Western United States. Then, those meta tags indicating Western United States college football would have the highest weighting and college football in general would have the next highest weighting. So, for example, a match could be determined when only the highest weighted meta tags match.

The criteria may be adjusted in one embodiment by the computer user and in another embodiment by the website or system that hosts the agent.

In a preferred embodiment of the present invention, as indicated by block 24, and assuming there are several related websites found after searching, the next step in the process may be ordering the list of related websites according to the closest matches to the meta tags of the computer user profile. That is, the related websites may be placed in the order of relevance. For example, take our computer user who has an interest in football and baseball. The computer user may have used the criteria in blocks 16, 18 to determine a match when the meta tags of the profile from the second social networking website indicate an interest in football or baseball. There is likely to be quite a few related websites pertaining to football or baseball. The related websites found could then be ordered according to predetermined criteria such as those websites having the largest number of matches or those websites having the highest score or weighting. As an example, the related websites could be ordered first by professional sports, then collegiate sports and then high school sports. The criteria selected may be made by the computer user or remotely by a website or system hosting the agent.

Again assuming that at least one related website is found, the next step is presenting a list of the related websites to the computer user as indicated in block 26. In a preferred embodiment of the invention, the list of related websites would be presented in an ordered manner as indicated above in block 24.

It can be appreciated that if the process according to the present invention is followed, a computer user, after building a profile, may select a social networking website of interest and then search for any related website that has meta tags common to both the computer user's profile and the profile from the selected social networking website. This makes for a very efficient and rich internet searching experience.

In another preferred embodiment of the present invention, the process may include a further step of learning related websites that are of no interest, indicated by block 28. It is expected that even with the commonality between the meta tags of the computer user's profile and the meta tags of the profile from the second social networking website, there may be some related websites found which are of no or little interest to the computer user. The reason for this is that meta tags are nonhierarchical and can be prone to impreciseness. Accordingly, it is desirable to have a way to "weed out" websites of no or little interest before presenting the list of related websites to the computer user.

Figure 3:
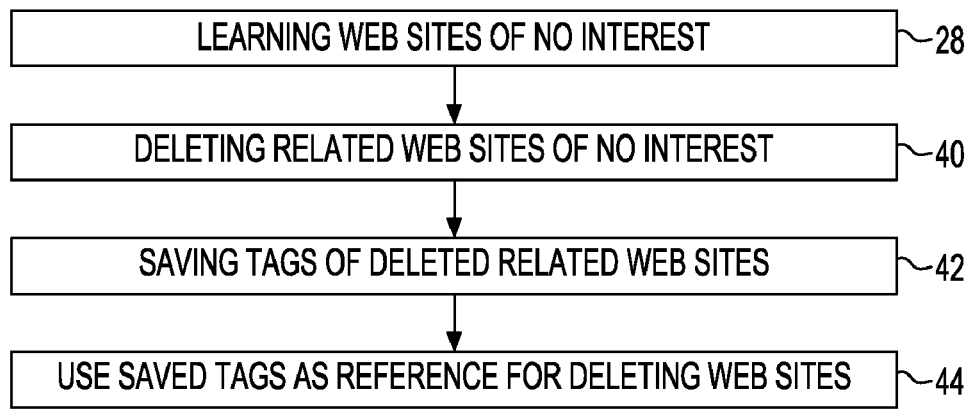
FIG. 3 is a flow chart in more detail of the last step of the process according to the present invention.

Referring now to FIG. 3, there is described a process of learning the websites of no or little interest. The first step is deleting any related websites that are of no or little interest to the computer user as indicated by block 40. The next step is saving the meta tags of the deleted related websites as indicated by block 42. The last step is using the saved meta tags as a reference for deleting related websites before presenting them to the computer user as indicated by block 44. The learning process is accomplished by a data mining algorithm that persons skilled in the art know how to write and use.

The learning needed to do the weeding out of the websites of no or low interest can be summarized in the following way. In one preferred embodiment, a low-interest related website can be manually "marked" by the computer user. Once the computer user indicates that a related website is of no interest, characteristics (key words, other attributes) of that site are extracted. Other websites with similar characteristics are therefore not sent to this user in the future.

In another preferred embodiment, the related web site of no or low interest can be determined automatically. For example, a website is sent to the computer user, but the computer user never goes to that website (based on the name or description of that site). A conclusion is made that websites of this type are of no or low interest, and websites of this type in the future are not sent, or are sent with lower priority. As another example, another related website is sent to the computer user. The computer user goes to that website, but spends less time than the computer user generally spends on other websites that have been sent to the computer user. A conclusion is drawn that this website is of low interest. Keywords and other attributes are extracted, and websites of this type get a lower interest ranking.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

The invention claimed is:

1. A method of presenting websites to a computer user, the method comprising the steps of:
   obtaining a profile of a first computer user that contains meta tags descriptive of the participants of a first social networking website;
   selecting a second social networking website having meta tags;
   selecting a profile of a second computer user from the second social networking website;
   comparing the meta tags of the first computer user profile with the meta tags of the second computer user profile from the second social networking website to determine at least one match between the meta tags of the first computer user profile and the meta tags of the second computer user profile from the second social networking website;
   searching for related websites having at least one meta tag that matches the at least one matched meta tag of the second computer user profile from the second social networking website;
   presenting a first list of the related websites to the first computer user;
   deleting related websites that are of no interest to the first computer user while saving the meta tags of the deleted related websites; and
   presenting a second list of related websites to the first computer user without including related websites that are of no interest to the first computer user by using the saved meta tags of the deleted related websites as a reference for deleting related websites that are of no interest to the first computer user before presenting the second list of related websites to the first computer user.

2. The method of claim 1 wherein the step of obtaining a profile comprising:
   accessing the first social networking website;
   collecting a set of meta tags that describe the participants of the first social networking website; and
   forming a profile based on the set of meta tags from the first social networking website.

3. The method of claim 1 further comprising the step of ordering the list of related websites in a particular order according to predetermined criteria.

4. The method of claim 3 wherein the meta tags of each related website are scored according to a predetermined criteria and the list of related websites are ordered according to a range of a strongest match to a weakest match.

5. The method of claim 1 wherein the step of comparing comprises determining a predetermined number of meta tags in common between the meta tags of the first computer user profile and the meta tags of the second computer user profile of the second social networking website.

6. The method of claim 1 wherein the step of comparing comprises scoring the meta tags of the first computer user profile according to a predetermined criteria and determining a match of those meta tags of the first computer user profile having the highest score.

7. The method of claim 1 wherein in the step of comparing, there is not at least one match between the meta tags of the first computer user profile and the meta tags of the profile of the second computer user from the second social networking, then further comprising the step of selecting a profile of a third computer user from the second social networking website.

8. The method of claim 7 further comprising the step of selecting a profile of another computer user that is not the first, second or third computer user from the second social networking website until there is at least one match in the step of comparing.

9. A non-transitory computer readable storage medium storing instructions that, when executed by a computer, causes the computer to perform a method of presenting websites to a first computer user, the method comprising the steps of:

obtaining a profile of a first computer user that contains meta tags descriptive of the participants of a first social networking website;
selecting a second social networking website having meta tags;
selecting a profile of a second computer user from the second social networking website;
comparing the meta tags of the first computer user profile with the meta tags of the second computer user profile from the second social networking website to determine at least one match between the meta tags of the first computer user profile and the meta tags of the second computer user profile from the second social networking website;
searching for related websites having at least one meta tag that matches the at least one matched meta tag of the second computer user profile from the second social networking website;
presenting a list of the related websites to the first computer user;
deleting related websites that are of no interest to the first computer user while saving the meta tags of the deleted related websites; and
presenting a second list of related websites to the first computer user without including related websites that are of no interest to the first computer user by using the saved meta tags of the deleted related websites as a reference for deleting related websites that are of no interest to the first computer user before presenting the second list of related websites to the first computer user.

10. The computer readable storage medium of claim 9 wherein the step of obtaining a profile comprising:
accessing the first social networking website;
collecting a set of meta tags that describe the participants of the first social networking website; and
forming a profile based on the set of meta tags from the first social networking website.

11. The computer readable storage medium of claim 9 further comprising the step of selecting a profile of another computer user that is not the first or second computer user from the second social networking website until there is at least one match in the step of comparing.

12. A non-transitory computer program product comprising:
a non-transitory computer usable medium having computer readable program code means embodied therein for a website presenting method, the computer readable program code means in the computer program product comprising:
computer readable program code means for causing a computer to obtain a profile of a first computer user that contains meta tags descriptive of the participants of a first social networking website;
computer readable program code means for causing a computer to select a second social networking website having meta tags;
computer readable program code means for causing a computer to select a profile of a second computer user from the second social networking website;
computer readable program code means for causing a computer to compare the meta tags of the first computer user profile with the meta tags of the second computer user profile from the second social networking website to determine at least one match between the meta tags of the first computer user profile and the meta tags of the second computer user profile from the second social networking website;
computer readable program code means for causing a computer to search for related websites having at least one meta tag that matches the at least one matched meta tag of the second computer user profile from the second social networking website;
computer readable program code means for causing a computer to present a list of the related websites to the first computer user;
computer readable program code means for causing a computer to delete related websites that are of no interest to the first computer user while saving the meta tags of the deleted related websites; and
computer readable program code means for causing a computer to present a second list of related websites to the first computer user without including related websites that are of no interest to the first computer user by computer readable program code means for using the saved meta tags of the deleted related websites as a reference for deleting related websites that are of no interest to the first computer user before the second list of related websites is presented to the first computer user.

13. The computer program product of claim 12 wherein the computer readable program code means for causing a computer to obtain a profile comprising:
computer readable program code means for causing a computer to access the first social networking website;
computer readable program code means for causing a computer to collect a set of meta tags that describe the participants of the first social networking website; and
computer readable program code means for causing a computer to form a profile based on the set of meta tags from the first social networking website.

14. The computer program product of claim 12 further comprising computer readable program code means for causing a computer to select a profile of another computer user that is not the first or second computer user from the second social networking website until there is at least one match in the computer readable program code means for causing a computer to compare.

15. A method for a website presenting service the method comprising the steps of:
obtaining a profile of a first computer user that contains meta tags descriptive of the participants of a first social networking website;
selecting a second social networking website having meta tags;
selecting a profile of a second computer user from the second social networking website;
comparing the meta tags of the first computer user profile with the meta tags of the second computer user profile from the second social networking website to determine at least one match between the meta tags of the first computer user profile and the meta tags of the second computer user profile from the second social networking website;
searching for related websites having at least one meta tag that matches the at least one matched meta tag of the second computer user profile from the second social networking website;
presenting a list of the related websites to the first computer user;
deleting related websites that are of no interest to the first computer user while saving the meta tags of the deleted related websites; and
presenting a second list of related websites to the first computer user without including related websites that are of no interest to the first computer user by using the saved meta tags of the deleted related websites as a reference for deleting related websites that are of no interest to the first computer user before presenting the second list of related websites to the first computer user.

16. The method of claim 15 wherein the step of obtaining a profile comprising:

accessing the first social networking website;

collecting a set of meta tags that describe the participants of the first social networking website; and forming a profile based on the set of meta tags from the first social networking website.

\* \* \* \* \*